March 9, 1965   J. W. WETZEL ETAL   3,172,997
ELECTRIC HEATING SYSTEMS
Filed Feb. 7, 1963   3 Sheets-Sheet 1
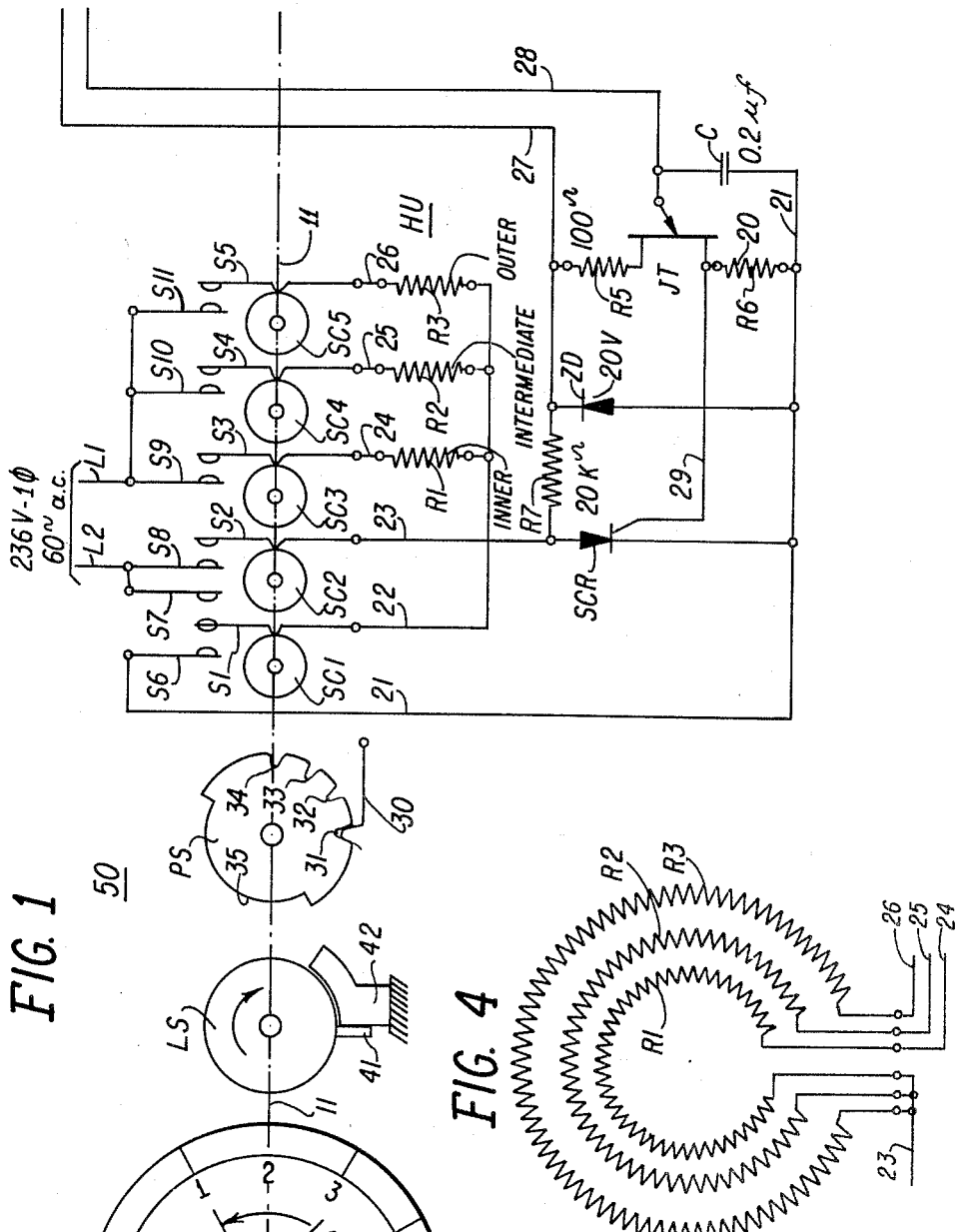
INVENTOR.
JOHN W. WETZEL
HARRIS P. KAMIDE
BY Brangley, Baird, Clayton, Miller & Vogel,
ATTYS.

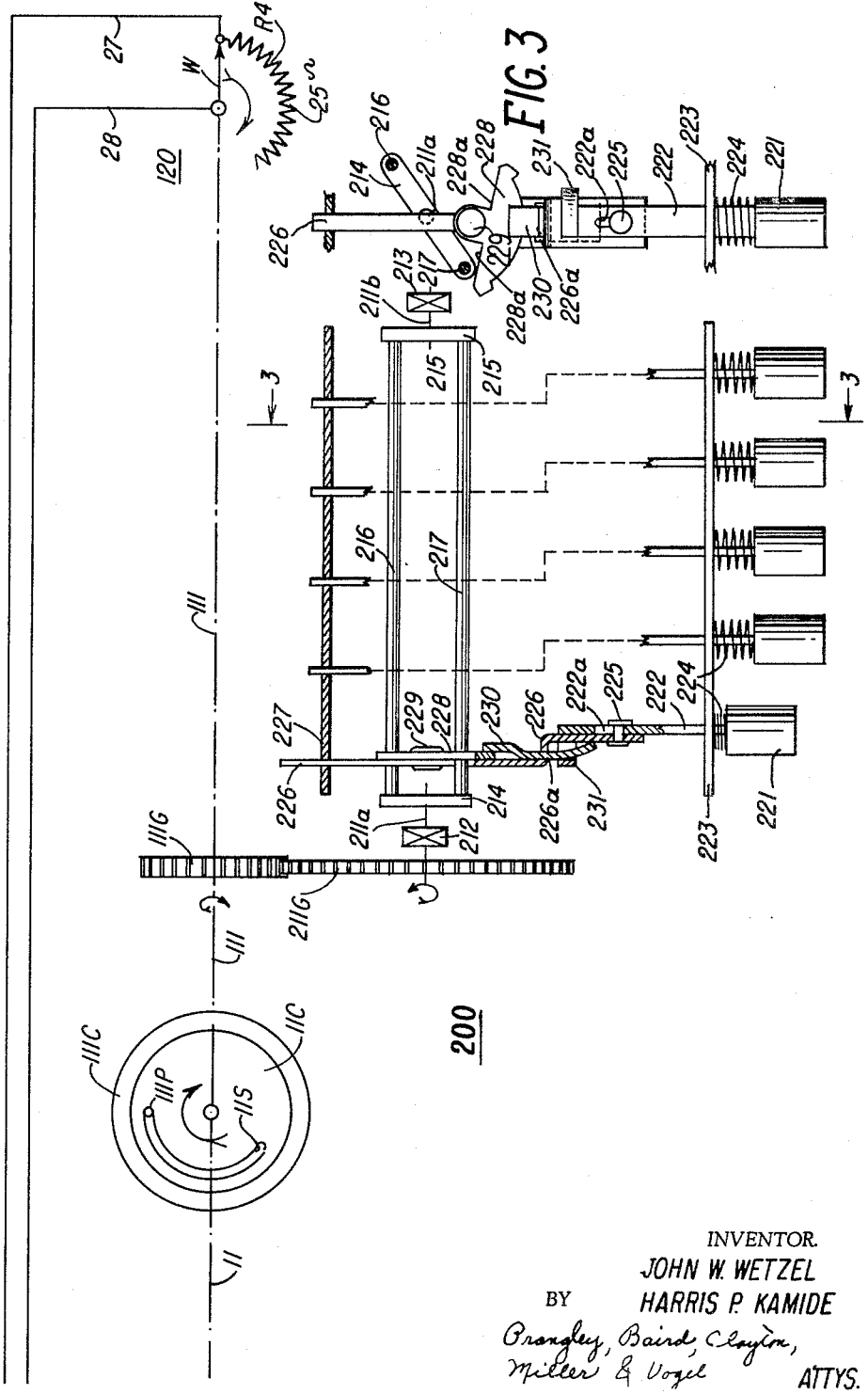

March 9, 1965    J. W. WETZEL ETAL    3,172,997
ELECTRIC HEATING SYSTEMS
Filed Feb. 7, 1963    3 Sheets-Sheet 3

INVENTOR.
JOHN W. WETZEL
HARRIS P. KAMIDE
BY
Prangley, Baird, Clayton,
Miller & Vogel,
ATTYS.

United States Patent Office 3,172,997
Patented Mar. 9, 1965

3,172,997
ELECTRIC HEATING SYSTEMS
John W. Wetzel, Glen Ellyn, and Harris P. Kamide, Franklin Park, Ill., assignors to General Electric Company, a corporation of New York
Filed Feb. 7, 1963, Ser. No. 256,970
10 Claims. (Cl. 219—489)

The present invention relates to electric heating systems, and more particularly to such systems incorporated in cooking appliances.

It is a general object of the present invention to provide an electric heating system comprising a manually operable first controller having an "off" position and a variable "control" position, a manually operable second controller having a fixed number of "control" positions, control apparatus operatively connected to both of the controllers and selectively positionable within a predetermined control range, whereby the control apparatus may be positioned into any number of control positions within its control range by corresponding operation of the first controller and may be positioned into any one of a fixed number of particular control positions within its control range by corresponding operation of the second controller, a control circuit selectively governed by the control apparatus, and a heating unit selectively governed by the control circuit, whereby the supply to the heating unit of any amount of power within a given control range may be preset by the first controller and the supply to the heating unit of a fixed number of particular amounts of power within the control range may be preset by the second controller.

Another object of the invention is to provide an electric heating system of the character described, wherein the first controller is selectively settable into an infinite number of individual control positions within its control range and the second controller is selectively settable only into a fixed number of individual positions within its control range, whereby the first controller is especially designed to obtain vernier setting of the control apparatus into any one of an infinite number of possible control settings thereof and the second controller is especially designed to obtain quick setting of the control apparatus into any one of a few of its possible control settings.

A further object of the invention is to provide an electric heating system of the character described, wherein the first controller is of the rotatable dial-controlled type, and the second controller is of the pushbutton-controlled type, whereby the first controller is characterized by accurate control settings and the second controller is characterized by quick control settings.

A further object of the invention is to provide a heating system comprising a heating unit, a source of electric power, switching mechanism, control apparatus, a control circuit, a manually operable first controller having an "off" position and a "high" position and a variable "low" position, and a manually operable second controller having a fixed number of "control" positions, wherein operation of the first controller into its "off" position actuates the switching mechanism to disconnect the heating unit from the power source and operation of the first controller into its "high" position actuates the switching mechanism to connect the heating unit to the power source independently of the control circuit and operation of the first controller into its "low" position actuates the switching mechanism to connect the heating unit and the control circuit in series relation to the power source, wherein the first controller is selectively operable within its "low" position correspondingly to vary the position of the control apparatus, wherein the second controller is selectively operable into any one of its "control" positions correspondingly to set a particular control position of the control apparatus, wherein the control apparatus governs in accordance with the control position thereof the control circuit, and wherein the control circuit controls in accordance with the governing thereof the amount of power that is supplied to the series connection from the power source, thereby correspondingly to govern the amount of power that is expended in the heating unit in order correspondingly to establish the temperature thereof.

A still further object of the invention is to provide a heating system of the character described, wherein the actuation of the switching mechanism is confined to the first controller, so that operation of the second controller is without effect to control the supply of power to the heating unit unless the first controller occupies its "low" position, so that the first controller constitutes a master controller and the second controller constitutes an auxiliary controller.

Further features of the invention pertain to the particular arrangement of the elements of the electric heating system and of the circuit connections, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURES 1 and 2, taken together, are a diagrammatic illustration of an electric heating system, embodying the present invention, and including a manually operable control switch, a manually operable pushbutton controller, and an electric heating unit provided with three individual heating elements;

FIG. 3 is a lateral sectional view of the pushbutton controller, taken in the direction of the arrows along the line 3—3 in FIG. 2;

FIG. 4 is a diagrammatic illustration of the three individual heating elements arranged to form a unified hotplate that is especially adapted for use in carrying out cooking operations in a cooking appliance;

FIG. 5 is a diagrammatic illustration of the circuits completed when the control switch mentioned occupies its "high" position;

FIG. 6 is a diagrammatic illustration of the circuits completed when the control switch mentioned occupies its "medium high" position;

FIG. 7 is a diagrammatic illustration of the circuits completed when the control switch mentioned occupies its "medium" position; and FIG. 8 is a diagrammatic illustration of the circuits completed when the control switch mentioned occupies its "low" position.

Referring now to FIGS. 1 and 2 of the drawings, there is diagrammatically illustrated an electric heating system embodying the features of the present invention, and essentially comprising an electric heating unit HU, including three individual heating elements R1, R2 and R3, a manually operable rotary dial 10, a unitary control switch 50 selectively operated by the dial 10, a manually operable controller 200 of the pushbutton type, a source of electric power supply of 236 volts, single phase, 60 cycles, A.-C., including a pair of line conductors L1 and L2, and a circuit network, including an adjustable rheostat 120. In the arrangement, the rheostat 120 may be selectively adjusted either by corresponding rotation of the dial 10 or by corresponding operation of the controller 200, for a purpose more fully explained hereinafter.

As best illustrated in FIG. 4, the heating unit HU is in the form of a hotplate that is especially suited to carrying out cooking operations in a cooking appliance, such as an electric range; whereby the three individual heating elements R1, R2 and R3 are respectively arranged in inner, intermediate and outer positions in the hotplate. The hotplate HU is normally constructed of disk-like form and is adapted directly to support the cooking vessel containing the food to be cooked. Preferably, the individual heating elements R1, R2 and R3 are of the usual sheathed resistance conductor type, so as to eliminate shock-hazard, all in a conventional manner.

Reverting to FIG. 1, the rotary dial 10 is mounted upon the extremity of a rotary shaft 11 incorporated in the unitary control switch 50 that may be of any well-known type, such, for example, as that illustrated. The dial 10 cooperates with an externally mounted index marker 12 and comprises an annular skirt carrying indicia indicative of the corresponding positions of the dial 10. Specifically, the dial 10 comprises the fixed positions "off," "high," "medium high" and "medium" and the variable position "low," and the skirt of the dial 10 carries the corresponding indicia cooperating with the index marker 12. In the arrangement, the "low" position subtends an angle of 150°, and the same is calibrated from "6" down to "1," representing progressively lower heat settings in the "low" position of the dial 10, as explained more fully below. The positions mentioned of the dial 10 are established by a position cam PS rigidly secured to the rotatably mounted shaft 11 and a cooperating spring 30. Specifically, the position cam PS is substantially disk-like, having four V-shaped notches 31, 32, 33 and 34 formed in adjacent positions in the periphery thereof and having a long notch 35 formed in the periphery thereof; which notches mentioned cooperate with the spring 30. Specifically, when the dial 10 is rotated into its "off" position, as indicated by the cooperating index marker 12, the spring 30 falls into the notch 31 in the position cam PS, so as to preserve this fixed "off" position of the dial 10, in an obvious manner. The "high," "medium-high" and "medium" positions of the dial 10 also comprises fixed positions that are preserved by the spring 30 respectively cooperating with the notches 32, 33 and 34 in the position cam PS. On the other hand, the "low" position of the dial 10 comprises a variable position thereof, so that the spring 30 cooperates with the long notch 35 in the position cam PS in order to accommodate infinite rotary adjustment of the dial 10 in its variable "low" position in an obvious manner.

Also, the rotatably mounted shaft 11 has rigidly secured thereto a limit stop LS carrying a stop pin 41 that cooperates with an exteriorly mounted stop abutment 42; whereby the dial 10 may be rotated from its "off" position illustrated only in the clockwise direction and only through a total angle of 300°, as permitted by the cooperation between the stop pin 41 and the stop abutment 42, as clearly illustrated.

The unitary control switch 50 further comprises five insulating control cams SC1, SC2, SC3, SC4 and SC5 rigidly secured to the rotary shaft 11, and arranged selectively to control the positions of five respectively associated resilient movable switch springs S1, S2, S3, S4 and S5. The movable switch spring S1 is a double-throw spring and selectively governs two stationary switch springs S6 and S7; and the switch springs S2, S3, S4 and S5 are single-throw springs and respectively govern four stationary switch springs S8, S9, S10 and S11.

The rheostat 120 comprises a rotary shaft 111 carrying a wiper W on the extreme inner end thereof; which wiper W cooperates with an adjustable resistor R4. The extreme inner end of the rotary shaft 11 carries a clutch plate 11C that cooperates with a clutch plate 111C carried by the extreme outer end of the rotary shaft 111. More particularly, a lost-motion slot 11S is formed in the clutch plate 11C that subtends an angle of 150°; which slot 11S cooperates with a stop pin 111P affixed to the clutch plate 111C. In the arrangement, the dial 10 is rotated from its "off" position 150° in the clockwise direction into its "low" position and to the figure 6 therein, and is then rotatable 150° in the clockwise direction in its "low" position and to the figure "1" therein, the figure "6" representing the high end of the "low" position of the dial 10 and the figure "1" representing the low end of the "low" position of the dial 10. During the initial 150° of rotation of the dial 10, the rotary shaft 11 is rotated therewith causing rotation of the clutch plate 11C, whereby the slot 11S is moved into engagement with the pin 111P. During the subsequent 150° of rotation of the dial 10, the rotary shaft 11 effects corresponding rotation of the rotary shaft 111, since the end of the slot 11S in the clutch plate 11C is in engagement with the pin 111P carried by the clutch plate 111C, whereby the wiper W of the rheostat 120 is likewise rotated from its normal position engaging the very beginning of the resistor R4 into its fully operated position engaging the very end of the resistor R4, all for a purpose more fully explained hereinafter. During the initial return rotation of the dial 10 in the counterclockwise direction through 150°, the wiper W remains in its adjusted position; and during the final return rotation of the dial 10 back into its "off" position, the wiper W is rotated back into its normal position. This arrangement is employed for a purpose more fully explained subsequently, and renders it necessary for the dial 10 to effect the desired adjustment of the wiper W with respect to the resistor R4 in the forward or clockwise rotation of the dial 10 from its "off" position. The wiper W terminates a conductor 28 and the beginning of the resistor R4 terminates a conductor 27. Thus, the wiper W shorts the conductor 28 to the conductor 27 when the wiper W occupies its normal position illustrated; and as the wiper W is rotated out of its normal position successively increasing amounts of the resistor R4 are connected between the conductors 28 and 27 in an obvious manner and for a purpose explained subsequently. Hence, when the dial 10 is rotated to present the figure "6" in its "low" position to the index marker 12, the conductor 28 is connected directly by the wiper W to the conductor 27; and when the dial 10 is rotated to present the figure "1" in its "low" position to the index marker 12, the conductor 28 is connected via the full resistor R4 by the wiper W to the conductor 27.

The pushbutton controller 200 may be of any conventional type, such, for example, as that illustrated; which controller 200 is of the fundamental construction and arrangement of that shown in U.S. Patent No. 2,793,531, granted on May 28, 1957, to Reynold E. Thompson. More particularly, the controller 200 comprises a pair of longitudinally spaced-apart and aligned stub shafts 211a and 211b suitably journalled respectively in a pair of bearings, indicated at 212 and 213; the inner ends of the stub shafts 211a and 211b respectively carry a pair of arms 214 and 215; and the opposite outer ends of the arms are rigidly connected together by a pair of rock shafts 216 and 217 disposed in parallel spaced-apart relation. In the present arrangement, the two stub shafts 211a and 211b of the controller 200 are arranged in parallel relation with the rotary shaft 111 of the rheostat 120; and the outer end of the stub shaft 211a carries a gear 211G that meshes a gear 111G carried by the rotary shaft 111. The gears 111G and 211G bear the tooth ratio of 1:2 so that 150° rotation of the rotary shaft 111 effects 75° rotation of the stub shaft 211a, and conversely 75° rotation of the stub shaft 211a effects 150° rotation of the rotary shaft 111.

Reverting to the construction of the controller 200, the same further comprises a number of identical pushbuttons, five being illustrated for purpose of explanation, as indicated at 221. Each pushbutton 221 is rigidly affixed to a front strap 222 that is mounted for reciprocation in a slot provided in a front plate 223; and each pushbutton 221 is normally biased into its "out" position by an associated compression spring 224 disposed in surrounding relation with the adjacent front strap 222 and in interposed relation with respect to the front plate 223; whereby the pushbutton 221 is actuated into its "in" position against the bias of the adjacent spring 224; and whereby the pushbutton 221 is returned by the adjacent spring 224 into its normal "out" position incident to the release thereof. Each front strap 222 is connected by a rivet 225 to a rear strap 226 that is mounted for reciprocation in a slot provided in a rear plate 227; which rivet 225 rides in a slot 222a provided in the adjacent front strap 222, for a purpose more fully explained subsequently. Each rear strap 226 projects through the pair of rock shafts 216, 217; whereby the rock shaft 216 is disposed below each rear strap 226 and the rock shaft 217 is disposed above each rear strap 226, as best shown in FIG. 3.

Each rear strap 226 carries a cam 228 rotatably secured thereto by a rivet 229; which cam 228 may be adjusted into any desired rotary position within a substantial angle; and which cam 228 is normally locked or clamped into its adjusted position by a tongue 230 carried in a hole 226a provided in a knee formed in the adjacent rear strap 226. In turn, each tongue 230 is normally locked or clamped in place by a cooperating fixture 231 carried by the adjacent front strap 222. Each cam 228 carries a pair of front bumper surfaces 228a respectively disposed on opposite sides of the rivet 229 and respectively cooperating with the rock shafts 216 and 217.

Considering now the general mode of operation of the controller 200, it is first pointed out that when the dial 10 occupies its "off" position, the pin 111P carried by the clutch plate 111C engages the front end of the slot 11S in the clutch plate 11C, whereby it is not possible to effect operation of the controller 200, since such operation thereof would tend to rotate the rotary shaft 111 in the clockwise direction causing the pin 111P to rotate the clutch plate 11C in the clockwise direction so as to rotate the rotary shaft 11 therewith in the clockwise direction; which rotation is prevented by the engagement of the spring 30 into the notch 31 in the position cam PS.

Thus, the dial 10 must first be rotated out of its "off" position into the beginning of its "low" position and to the figure "6" in order to render the controller 200 operative for the present purpose. This rotation of the dial 10 rotates the slot 11S in the clutch plate 11C forwardly with respect to the pin 111P carried by the clutch plate 111C, thereby to free the rotary shaft 111 for rotation through any angle up to 150° in the clockwise direction under the control of the controller 200, as explained below.

Now assume that the dial 10 occupies its "low" position presenting the figure "6" to the index marker 12 and that the pushbutton 221 next to the right-hand end thereof is to be operated and that the rock shafts 216 and 217 occupy the positions, as illustrated in FIG. 3, which do not correspond to the pushbutton 221 mentioned. When the pushbutton 221 mentioned is operated into its "in" position, the spring 224 is compressed and the straps 222 and 226 are moved inwardly; whereby the cam 228 carried by the rear strap 226 adjusts or rotates the rock shafts 216 and 217 into a corresponding angular position to match that of the bumper surfaces 228a provided upon the cam 228 in its particular rotary position of adjustment. Of course, rotation of the rock shafts 216 and 217 into a particular angular position causes rotation of the stub shaft 211a into an identical angular position, with the result that the gears 211G and 111G effect rotation of the rotary shaft 111 into a corresponding rotary position effecting a corresponding adjustment of the wiper W of the rheostat 120 in an obvious manner. Upon the release of the pushbutton 221, it is returned by the adjacent spring 224 back into its "out" position. In the arrangement, the operation of any one of the pushbuttons 221 effects rotation of the rock shafts 216 and 217 in the clockwise direction, as viewed in FIG. 3, which is the counterclockwise direction, as viewed in FIG. 2, with the result that the rotary shaft 111 is rotated in the clockwise direction, as viewed in FIG. 2.

Now it may be assumed that the five cams 228 respectively carried by the five rear straps 226 occupy different angular positions about the five rivets 229; whereby the five pushbuttons 221 are respectively preset to correspond to five particular control positions of the rheostat 120 within its operative range of 150°.

Considering now that the cook may have determined that one cooking operation is best carried out when the rheostat 120 is adjusted corresponding to a dial position between "2" and "3"; another is best accomplished when the dial setting is at "4"; a third is best accomplished when the dial setting is between "4" and "5," etc. She does not want to have to remember these specific settings but can in some way mark one of the buttons 221 for the first cooking operation, another one for the second operation, and a third for the third operation. The present invention makes it possible for her thereafter to accomplish these cooking operations merely by setting the dial at one number, such as "6," and then pushing the appropriate button.

Assuming that the extreme left hand button 221 it to be preset for the first cooking operation, the cook rotates the dial to the proper position between "2" and "3." This, of course, rotates the wiper W accordingly, and also rotates the rock shafts 216, 217 by virtue of the gearing 111G and 211G. The pushbutton 221 mentioned is then pulled forwardly with respect to its normal "out" position; whereby the front end of the rear strap 226 engages the front plate 223 as a stop, while the front strap 222 moves further forwardly to the extent of the slot 222a, with the result that the fixture 231 rides forwardly out of clamping engagement with the tongue 230. Thus, the tongue 230 releases the cam 228 to accommodate free rotation thereof about the rivet 229. Then the pushbutton 221 is operated directly through its normal "out" position and into its "in" position; whereby the front and rear straps 222 and 226 move therewith. As the cam 228 engages the shafts 216 and 217 it simply rotates about the rivet 229 to assume the preset angular positions of the rock shafts 216 and 217 and into engagement therewith, so as thereafter to be able to set the angular positions of the rock shafts 216 and 217 that correspond to the preset positions of the rheostat 120. As the pushbutton 221 continues into its full "in" position, it causes the front strap 222 to force the fixture 231 over and into clamped relation with the outer end of the tongue 230, whereby the tongue 230 is forced into clamped position with the cam 228, thereby to secure the adjusted and preset angular position of the cam 228. The pushbutton 221 is then released, so that it is returned into its normal "out" position. Thereafter, operation of the extreme left pushbutton 221 into its "in" position, after the dial 10 has been operated to present the figure "6" to the index marker 12, will further advance the rheostat 120 into its position corresponding to that which it had when the dial 10 had been at the desired point between "2" and "3," as previously explained. It will be understood that while the rheostat 120 is advanced by the operation of the pushbutton 221, as described above, the dial 10 is not advanced from its position presenting the figure "6" in its "low" position to the index marker 12, because of the lost-motion arrangement of the slot-pin connection 11S, 111P, as previously described.

Reverting to FIG. 1, the electric heating system further comprises a solid state controlled rectifier SCR, preferably of the silicon crystal type, a zener diode ZD, a unijunction transistor JT, a capacitor C, and three additional resistors R5, R6 and R7.

In the circuit network, the switch springs S1, S2, S3, S4 and S5 respectively terminate five conductors 22, 23, 24, 25 and 26; the switch spring S6 terminates a conductor 21; the two switch springs S7 and S8 terminate the line conductor L2; and the switch springs S9, S10 and S11 terminate the line conductor L1. The heating element R1 is bridged across the conductors 22 and 24; the heating element R2 is bridged across the conductors 22 and 25; and the heating element R3 is bridged across the conductors 22 and 26. The power terminals of the solid state controlled rectifier SCR are respectively connected to the conductors 23 and 21; and the control terminal of the solid state controller rectifier SCR is connected to a conductor 29. The power terminals of the unijunction transistor JT are respectively connected by the resistors R5 and R6 to the conductors 27 and 21; and the emitter of the unijunction transistor JT is connected to the conductor 28. Also the conductor 29 is connected to one of the power terminals of the unijunction transistor JT, at the connection to which one terminal of the resistor R6 is made. The capacitor C is bridged across the conductors 21 and 28; and the zener diode ZD is bridged across the conductors 21 and 27. Finally, the resistor R7 is connected between the conductors 23 and 27.

Considering now the mode of operation of the circuit network, when the dial 10 occupies its "off" position, the cams SC1, SC2, SC3, SC4 and SC5 carried by the shaft 11 operate the switch springs S1, S2, S3, S4 and S5 to disengage the switch springs S6, S7, S8, S9, S10 and S11, and the shaft 11 operates the wiper W to engage the beginning of the resistor R4, as shown in FIGS. 1 and 2; whereby all of the circuits are interrupted, so that the heating elements R1, R2 and R3 are deenergized.

When the dial 10 is rotated into its "high" position, the elements of the circuit network are operated into the positions, as shown in FIG. 5; whereby the three heating elements R1, R2 and R3 are energized in parallel relation across the line conductors L1 and L2, with the result that the heating unit HU develops high heat at 4200 watts.

When the dial 10 is rotated into its "medium high" position, the elements of the circuit network are operated into the positions, as shown in FIG. 6; whereby only the two heating elements R1 and R2 are energized in parallel relation across the line conductors L1 and L2, with the result that the heating unit HU develops medium high heat at 2700 watts.

When the dial 10 is rotated into its "medium" position, the elements of the circuit network are operated into the positions, as shown in FIG. 7; whereby only the single heating element R1 is energized across the line conductors L1 and L2, with the result that the heating unit HU develops medium heat at 1300 watts.

When the dial 10 is rotated into its "low" position, the elements of the circuit network are operated into the positions, as shown in FIG. 8; whereby the heating elements R1, R2 and R3 are connected in parallel relation with each other and in series relation with the solid state controlled rectifier SCR across the line conductors L1 and L2, with the result that the heating unit HU develops low heat within the range 1000 to 0 watts and depending upon the particular adjusted position of the dial 10 within its variable "low" position, as explained more fully hereinafter. More particularly, the line conductor L1 is connected by the engaged switch springs S9, S3 and S10, S4 and S11, S5 to the respective conductors 24, 25 and 26; and the conductors 24, 25 and 26 are respectively connected via the heating elements R1, R2 and R3 to the conductor 22; the conductor 22 is connected via the engaged switch springs S1, S6 to the conductor 21; the conductor 21 is connected via the solid state controlled rectifier SCR to the conductor 23; and the conductor 23 is connected via the engaged switch springs S2, S8 to the line conductor L2.

The solid state controlled rectifier SCR comprises four rectifying junctions in series, p-n-p-n, with the conductor 23 connected to the power terminal at the end p-junction, with the conductor 21 connected to the power terminal at the end n-junction, and with the conductor 29 connected to the control terminal at the intermediate p-junction. The rectifier SCR is characterized by a high impedance to the flow of current in either direction between the power terminals thereof, when no signal is applied to the control terminal thereof. The rectifier SCR is also characterized by a low impedance in the direction from the power terminal terminating the conductor 23 to the power terminal terminating the conductor 21, when a positive potential or signal of predetermined value is applied to the control terminal thereof to initiate the conduction of the rectifier SCR, as explained more fully below. Thus, the rectifier SCR blocks conduction through the elements R1, R2 and R3 in the half cycles of the power source, when the line conductor L2 is running negative relative to the line conductor L1, and accommodates conduction through the heating elements R1, R2 and R3 in the half cycles of the power source, when the line conductor L2 is running positive relative to the line conductor L1. However, such conductions mentioned are not initiated merely because the line conductor L2 is running positive, but must be initiated by the reception of a signal or positive pulse via the control terminal thereof; whereby any desired time-phase may be interposed with respect to the two conditions mentioned, so that the reception of early signals cause large rectified current pulses to be supplied to the heating elements R1, R2 and R3, and so that the reception of late signals cause small rectified current pulses to be supplied to the heating elements R1, R2 and R3. Of course, the large rectified current pulses cause the heating elements R1, R2 and R3 to develop large wattage (up to 1000 watts), while the small rectified current pulses cause the heating elements R1, R2 and R3 to develop small wattage (down to 0 watt), with all wattages therebetween, depending upon the time-phase relation of the signals received by the control terminal of the rectifier SCR with respect to that of the positive polarity of the line conductor L2 in the corresponding half cycles of the power source.

Considering now the operation of the circuit network in greater detail, when the line conductor L2 begins to run positive in a corresponding positive half cycle of the power source, this voltage is applied via the resistor R7 as a reverse potential across the zener diode ZD and between the conductors 27 and 21, due to the poling of the zener diode ZD, whereby the zener diode conducts a current from the conductor 27 to the conductor 21, thereby establishing the conductor 27 at a voltage of about 20 volts positive with respect to the conductor 21. Also, the zener diode ZD has an impedance characteristic such that it maintains substantially flat the voltage difference of about 20 volts between the conductors 27 and 21, as the voltage on the line conductor L2 continues to rise more positive with respect to the line conductor L1; whereby the zener diode ZD is said to have a "clipping" characteristic with respect to the peak positive voltage that ultimately develops upon the line conductor L2 in this positive half cycle of the supply source. This reference voltage of 20 volts that is thus applied by the zener diode ZD between the conductors 27 and 21 is a D.-C. voltage by virtue of the rectifying characteristic of the zener diode ZD. This reference voltage is also applied across the resistor R5, the transistor JT and the resistor R6; whereby an exceedingly small positive voltage is applied to the conductor 29, but without effect as a control signal upon the control electrode of the rectifier SCR, at this time. Also this reference voltage is applied from the conductor 27 via the resistor R4 and the wiper W to the conductor 28; whereby the capacitor C is charged between the conductors 28 and 21. In fact, the resistor R4 and the capacitor C are connected in series between the conductors 27 and 21, so that the charging rate of the capacitor C is inversely proportional to the amount of the resistor R4 that is included by the wiper W between the conductors 28 and 27; which is dependent upon the adjusted position of the dial 10 in its variable "low" position.

First assuming that the dial 10 occupies a medium numbered position (such as "4") in its "low" position, then a medium amount of the resistor R4 is included by the wiper W between the conductors 28 and 27, so that a medium charging rate is established for the capacitor C; whereby after the elapse of a medium time interval a charge is accumulated by the capacitor C such that the voltage thereacross reaches a response voltage, such, for example, as 10 volts. The presence of the response voltage of 10 volts positive upon the conductor 28 with respect to the conductor 21 and applied to the emitter of the transistor JT renders the transistor JT highly conductive so that the capacitor C is abruptly discharged through the transistor JT and the resistor R6 driving the conductor 29 to the control signal value of about 10 volts positive with respect to the conductor 21, as a consequence of the voltage drop across the resistor R6 as the capacitor C is discharged; which control signal applied to the conductor 29 comprises a positive "pip" impressed upon the control terminal of the rectifier SCR with respect to the power terminal thereof connected to the conductor 21; whereby the rectifier SCR is rendered conductive during the remainder of the present positive half cycle of the power source; with the result that a corresponding positive pulse of current is conducted from the line conductor L2 via the three heating elements R1, R2 and R3 in parallel relation and via the rectifier SCR in series relation therewith to the line conductor L1. This positive pulse represents only a medium amount of power; whereby the average power thus supplied to the heating elements R1, R2 and R3 in the positive half cycles of the power source may have a value of 500 watts, for example, since the dial 10 is set at the medium number "4" in the range of the "low" position thereof.

Now assuming that the dial 10 occupies the highest number "6" position in the "low" position thereof, the wiper W engages the contact at the beginning of the resistor R4, thereby connecting the conductor 28 directly to the conductor 27. The capacitor C thus has an exceedingly high charging rate so that the response voltage is reached very early in the positive half cycle of the power source, causing early conduction of the transistor JT and the consequent early conduction of the rectifier SCR, with the result that the positive pulse of current supplied to heating elements R1, R2 and R3, represents a maximum amount of power; whereby the average power thus supplied to the heating elements R1, R2 and R3 in the positive half cycles of the power source may have a value of 1000 watts, since the dial 10 is set the highest number "6" in the range of the "low" position thereof.

Now assuming that the dial 10 occupies the lowest number "1" position in the "low" position thereof, the wiper W engages the contact at the end of the resistor R4 in the connection between the conductors 28 and 27. The capacitor C thus has an exceedingly low charging rate so that the response voltage is not quite reached in the total time interval of the positive half cycle of the power source, with the result that the transistor JT is not rendered conductive, and neither is the rectifier SCR, during the time interval mentioned. Accordingly, the rectifier SCR remains non-conductive supplying 0 watt or no power to the heating elements R1, R2 and R3.

In view of the above it will be understood that the range of adjustment of the dial 10 between the numbers "6" and "1" corresponds to the full range of response of the circuit network; whereby any value of power between 1000 watts and 0 watt may be supplied to the heating elements R1, R2 and R3 in the "low" position of the dial 10 by adjusting the rotary position of the dial 10 between the numbers "6" and "1" in the "low" position thereof. Accordingly, the dial 10 has an infinite number of adjusted positions between the numbers "6" and "1" in the "low" position thereof, thereby correspondingly to set the circuit network into an infinite number of power supply positions between 1000 watts and 0 watt. Of course, the variable power supply positions of the circuit network, as explained above, represent generally corresponding temperature settings for a given cooking vessel supported by the hotplate HU in an obvious manner; whereby a calibration curve could be prepared for a particular cooking vessel and its contents relating the variable adjustments of the dial 10 in its "low" position to temperatures of the contents mentioned.

Recapitulating the operation of the rectifier SCR, this device is operative cyclicaly, and in each cycle of operation thereof a ratio is established between the conductive condition and the non-conductive condition thereof by the response time interval of the capacitor C; which response time interval mentioned is preset by the control position of the control apparatus W–R4 that is preset by the adjusted position of the dial 10 within its "low" position. Hence, the variable position of the dial 10 within its "low" position correspondingly presets the ratio between the conductive condition and the non-conductive condition of the rectifier SCR in each cycle of the power source, so as correspondingly to preset the amount of power that is supplied to the heating elements R1, R2 and R3 and consequently the corresponding temperature of the hotplate HU. Of course, the rectifier SCR operates at the frequency (60 cycles per second in the present example) of the power source.

The operation of the heating system in the "low" position of the dial 10 is the same, regardless of whether the final adjustment of the rheostat 120 is effected with the dial 10 or with the pushbutton controller 200.

The arrangement of the controller 200 in the heating system is very advantageous, since the same accommodates the storage of five particular adjustments or presettings of the rheostat 120 within the range of the "low" position of the dial 10 that may be employed quickly and in a ready manner, by first operating the dial 10 into its "low" position to present the figure "6" to the index marker 12, followed by operation of the particular one of the pushbuttons 221 corresponding to the particular desired setting of the rheostat 120. This arrangement for preserving the five particular settings within the "low" position of the dial 10 is very advantageous, since it is only within the "low" power supply range of the heating system that small differences in the amount of power supplied are significant in carrying out cooking operations. Thus, the cook may preset the five pushbuttons 221 of the controller 200 in accordance with the exact "low" power supply requirements of five frequently used cooking operations, thereby greatly facilitating the presetting of these particular five "low" power requirements for use in carrying out the five corresponding cooking operations.

In view of the foregoing, it is apparent that there has been provided in an electric heating system, a master manually operable first controller that is selectively operative into a plurality of fixed "high" positions respectively corresponding to relatively "high" power supply positions of the system and that is selectively operative into an infinite number of adjusted positions following operation thereof into a variable "low" position corresponding to a "low" power supply position of the system. Also, the system comprises a manually operable second controller of the pushbutton type that is selectively operative following operation of the master first controller into its "low" position, wherein the second controller comprises a given number of individual pushbuttons respectively corresponding to a given number of particular positions in the "low" power range of the system. The two controllers mentioned selectively govern electronic mechanisms in the "low" power range of the system, thereby to preset the amount of "low" power supplied to an associated heating unit. The arrangement is very advantageous since it is the corresponding band of low temperatures from about 150° F. to about 250° F. that it is highly desirable accurately to preset in carrying out cooking operations in a sauce pan, or the like, supported by the heating unit or hotplate.

While there has been described what is at present considered to be the preferred embodiment of the invention, it will be understood that various modifications may be made therein, and it is intended to cover in the appended claims all such modifications that fall within the true spirit and scope of the invention.

What is claimed is:

1. In an electric heating system including a heating unit, a source of electric power, switching mechanism selectively operative between an open position disconnecting said heating unit from said power source and a closed position connecting said heating unit to said power source, control apparatus variably positionable within a predetermined control range, and a control circuit variably governed by the control position within the control range of said control apparatus for correspondingly varying the amount of power within a given range that is supplied to said connected heating unit from said power source; the combination comprising a manually operable member having an "off" position and a variable "control" position, means responsive to operation of said member into its "off" position for operating said switching mechanism into its open position and responsive to operation of said member into its "control" position for operating said switching mechanism into its closed position, means responsive to variable operation of said member within its "control" position for correspondingly variably positioning said control apparatus within its control range, a fixed number of individual manually operable devices respectively corresponding to a fixed number of different and particular control positions of said control apparatus within its control range, means responsive to operation of any one of said devices for positioning said control apparatus into its corresponding one particular control position, and said fixed number of individual manually operable presetters for respectively selectively presetting said devices to correspond to desired particular control positions of said control apparatus.

2. In an electric heating system including a heating unit, a source of electric power, switching mechanism selectively operative between an open position disconnecting said heating unit from said power source and a closed position connecting said heating unit to said power source, control apparatus variably positionable within a predetermined control range, and a control circuit variably governed by the control position within the control range of said control apparatus for correspondingly varying the amount of power within a given range that is supplied to said connected heating unit from said power source; the combination comprising a first controller including a manually operable member having an "off" position and a variable "control" position, means responsive to operation of said member into its "off" position for operating said switching mechanism into its open position and responsive to operation of said member into its "control" position for operating said switching mechanism into its closed position, means responsive to variable operation of said member within its "control" position for correspondingly variably positioning said control apparatus within its control range, a fixed number of individual pushbuttons respectively corresponding to said fixed number of different and particular control positions of said control apparatus within its control range, means responsive to operation of any one of said pushbuttons for positioning said control apparatus into its corresponding one particular control position, and said fixed number of individual manually operable presetters for respectively selectively presetting said pushbuttons to correspond to desired particular control positions of said control apparatus.

3. In an electric heating system including a heating unit, a source of electric power, switching mechanism selectively operative between an open position disconnecting said heating unit from said power source and a closed position connecting said heating unit to said power source, control apparatus variably positionable within a predetermined control range, and a control circuit variably governed by the control position within the control range of said control apparatus for correspondingly varying the amount of power within a given range that is supplied to said connected heating unit from said power source; the combination comprising a manually operable member having an "off" position and a variable "control" position, means responsive to operation of said member into its "off" position for operating said switching mechanism into its open position and responsive to operation of said member into its "control" position for operating said switching mechanism into its closed position, means responsive to variable operation of said member within its "control" position for correspondingly variably positioning said control apparatus within its control range, a fixed number of individual pushbuttons, a rock shaft having a fixed number of different and particular angular positions respectively corresponding to said pushbuttons, means responsive to operation of any one of said pushbuttons for rotating said rock shaft into its corresponding one angular position, said fixed number of different and particular angular positions of said rock shaft respectively corresponding to said fixed number of different and particular control positions of said control apparatus within its control range, means responsive to rotation of said rock shaft into any one of its particular angular positions for positioning said control apparatus into its corresponding one particular control position, and said fixed number of individual manually operable presetters for respectively selectively presetting said pushbuttons to desired particular angular positions of said rock shaft.

4. In an electric heating system including a heating unit, a source of electric power, switching mechanism selectively operative between an open position disconnecting said heating unit from said power source and a closed position connecting said heating unit to said power source, control apparatus including a control shaft variably rotatable within a predetermined control range, and a control circuit variably governed by the control position of said control shaft within its control range for correspondingly varying the amount of power within a given range that is supplied to said connected heating unit from said power source; the combination comprising a manually rotatable member having an "off" position and a variable "control" position, means responsive to rotation of said member into its "off" position for operating said switching mechanism into its open position and responsive to rotation of said member into its "control" position for operating said switching mechanism into its closed position, means responsive to variable rotation of said member within its "control" position for correspondingly variably rotating said control shaft so as correspondingly variably to position the same within its control range, a rock shaft, a drive connection between said control shaft and said rock shaft so that said shafts have corresponding rotary positions and so that rotation of either one of said shafts effects corresponding rotation of the other of said shafts, a fixed number of individual pushbuttons, a fixed number of dogs respectively pivotably carried by said pushbuttons and commonly operatively associated with said rock shaft, said fixed number of locks respectively carried by said pushbuttons and respectively operatively associated with said dogs, each of said pushbuttons having a "normal" position and an "out" position and an "in" position, means responsive to operation of any one of said pushbuttons into its "out" position for actuating the corresponding one of said locks to unlock the corresponding one of said dogs, means responsive to operation of any one of said pushbuttons carrying an unlocked dog into its "in" position for first setting the unlocked dog into a particular angular position corresponding to the particular angular position of said rock shaft and for then actuating the corresponding one of said locks to lock the corresponding one of said dogs in its particular angular position, means responsive to operation of any one of said pushbuttons carrying a locked dog into its "in" position for rotating said rock shaft into a particular angular position corresponding to the angular position of the locked dog carried by said one pushbutton, and means for returning said pushbuttons into their "normal" positions following release thereof after operation of said pushbuttons into their "in" positions.

5. In an electric heating system including a heating unit, and a source of electric power; the combination comprising a manually operable first controller having an "off" position and a "high" position and a variable "low" position, switching apparatus selectively governed by said first controller, control apparatus variably positionable within a predetermined control range, a control device variably governed over a given control range by said control apparatus, said switching mechanism being governed by operation of said first controller into its "off" position to disconnect both said heating unit and said control device from said power source, said switching mechanism being governed by operation of said first controller into its "high" position to connect said heating unit directly to said power source independently of said control device, said switching mechanism being governed by operation of said first controller into its "low" position to connect said heating unit in series relation with said control device and to said power source, means including a first drive connection responsive to variable operation of said first controller within its "low" position for correspondingly positioning said control apparatus within its control range, a manually operable second controller having a fixed number of "control" positions respectively corresponding to said fixed number of different and particular control positions of said control apparatus within its control range, and means including a second drive connection responsive to operation of said second controller into any one of its "control" positions for positioning said control apparatus into its corresponding one particular control position within its control range, variable and particular positioning of said control apparatus within its control range correspondingly governing said control device within its control range, and variable governing of said control device within its control range correspondingly varying the amount of power within a given range that is supplied to said series connection from said power source, thereby correspondingly to govern the amount of power that is expended in said heating unit in said series connection.

6. The electric heating system combination set forth in claim 5, wherein said second controller is of the pushbutton type including a fixed number of individual pushbuttons respectively corresponding to said fixed number of "control" positions thereof, whereby operation of any one of said pushbuttons operates said second controller into the corresponding one of its "control" positions.

7. In an electric heating system including a heating unit, and a source of electric power; the combination comprising a first controller including a first rotatable shaft and carrying a manually operable dial having an "off" position and a "high" position and a variable "low" position, said "low" position beginning at an angle "A" from said "off" position and also subtending the angle "A," whereby said first shaft has rotary positions respectively corresponding to those of said dial, switching apparatus selectively governed by said first shaft, control apparatus including a second rotatable shaft and an element carried by said second shaft, said element being variably rotatable within a predetermined control range also corresponding to the angle "A," whereby said second shaft has rotary positions corresponding to those of said element, a control device variably governed over a given control range by said element, said switching mechanism being governed by rotation of said first shaft into its "off" position to disconnect said heating unit and said control device from said power source, said switching mechanism being governed by rotation of said first shaft into its "high" position to connect said heating unit directly to said power source independently of said control device, said switching mechanism being governed by rotation of said first shaft into its "low" position to connect said heating unit and said control device in series relation to said power source, a first drive connection of the lost-motion type between said first and second shafts, wherein initial rotation of said first shaft from its "off" position to its "low" position and through the angle "A" is not transmitted to said second shaft and further rotation of said first shaft within its "low" position and through the additional angle "A" is transmitted to said second shaft, a second controller including a third rotatable shaft and a fixed number of individual manually operable parts selectively operative to rotate said third shaft into said corresponding fixed number of different particular control positions within a control range disposed within an angle "B," and a second drive connection of the gear type between said second and third shafts, wherein rotation of said third shaft through the angle "B" effects rotation of said second shaft through the angle "A" and conversely, whereby said fixed number of different particular control positions of said third shaft within its control range respectively correspond to said fixed number of different particular control positions of said element within its control range, variable and particular positioning of said element within its control range correspondingly governing said control device within its control range, and variable governing of said control device within its control range correspondingly varying the amount of power within a given range that is supplied to said series connection from said power source, thereby correspondingly to govern the amount of power that is expended in said heating unit in said series connection.

8. The electric heating system combination set forth in claim 7, wherein the angle "A" is somewhat less than 180° and the angle "B" is somewhat less than 90°.

9. In an electric heating system including three heating elements and a source of electric power; the combination comprising a manually operable first controller having an "off" position and a "high" position and a "medium high" position and a "medium" position and a variable "low" position, switching apparatus selectively governed by said first controller, control apparatus variably positionable within a predetermined control range, a control device variably governed over a given control range by said control apparatus, said switching mechanism being governed by operation of said first controller into its "off" position to disconnect all three of said heating elements and said control device from said power source, said switching mechanism being governed by operation of said first controller into its "high" position to connect all three of said heating elements in parallel relation to each other and to said power source independently of said control device, said switching mechanism being governed by operation of said first controller into its "medium high" position to connect two of said three heating elements in parallel relation to each other and to said power source independently of said control device, said switching mechanism being governed by operation of said first controller into its "medium" position to connect one of said three heating elements to said power source independently of said control device, said switching mechanism being governed by operation of said first controller into its "low" position to connect all three of said heating elements in parallel with each other and in series relation with said control device and to said power source, means including a first drive connection responsive to variable operation of said first controller within its "low" position for correspondingly positioning said control apparatus within its control range, a manually operable second controller having a fixed number of "control" positions respectively corresponding to a fixed number of different and particular control positions of said control apparatus within its control range, and means including a second drive connection responsive to operation of said second controller into any one of its "control" positions for positioning said control apparatus into its corresponding one particular control position within its control range, variable and particular positioning of said control apparatus within its control range correspondingly governing said control device within its control range, and variable governing of said control device within its control range correspondingly varying the amount of power within a given range that is supplied to said series connection from said power source, thereby correspondingly to govern the amount of power that is expended in said three heating elements in said series connection.

10. The electric heating system combination set forth in claim 9, wherein said three heating elements are arranged in a hotplate so that first and second and third of said heating elements are respectively disposed in inner and intermediate and outer positions in said hotplate, said inner and intermediate heating elements constitute the two heating elements that are energized in the "medium high" position of said first controller, and said inner heating element constitutes the one heating element that is energized in the "medium" position of said first controller.

References Cited in the file of this patent
UNITED STATES PATENTS

| | | |
|---|---|---|
| 2,793,531 | Thompson | May 28, 1957 |
| 3,018,356 | Busch et al. | Jan. 23, 1962 |
| 3,064,091 | Turner | Nov. 13, 1962 |